[19] 3,557,886

| [72] | Inventor | James H. Cobbs |
| | | Tulsa, Okla. |
| [21] | Appl. No. | 837,477 |
| [22] | Filed | June 30, 1969 |
| [45] | Patented | Jan. 26, 1971 |
| [73] | Assignee | Fenix & Scisson, Inc. |
| | | Tulsa, Okla. |
| | | a corporation of Oklahoma |

[54] METHOD AND APPARATUS FOR MEASURING IN SITU THE EARTH STRESS AT A PRESELECTED SUBTERRANEAN AREA
6 Claims, 6 Drawing Figs.

[52] U.S. Cl. .................................................. 175/50, 73/88
[51] Int. Cl. .................................................. E21b 47/12, G01b 5/30
[50] Field of Search .................................................. 175/40, 50; 166/285, 250; 73/88E, 151

[56] References Cited
UNITED STATES PATENTS

| 1,708,333 | 4/1929 | Smith | 73/88(E) |
| 3,175,392 | 3/1965 | Tharalson et al. | 175/50X |
| 3,422,672 | 1/1969 | Payne | 175/50X |
| 3,489,000 | 1/1970 | Haverkate | 73/88(E) |

*Primary Examiner*—David H. Brown
*Attorney*—Head and Johnson

ABSTRACT: This invention relates to a method and apparatus for measuring in situ the earth stress at a preselected subterranean area. More particularly, the invention relates to a method and apparatus of measuring the earth stress at a preselected subterranean area including drilling a large diameter borehole in the earth's surface to a point immediately above the preselected area, drilling a small diameter borehole from the bottom of the large diameter borehole into the preselected area, positioning into the small borehole an expandable sleeve having a plurality of strain rosettes thereon, injecting cement exteriorly of the expandable sleeve, applying hydraulic pressure to the interior of the expandable sleeve to expand the same against the wall of the small diameter hole whereby the strain rosettes are cemented to the earth's structure forming the circumference of the small diameter borehole, and drilling the large diameter borehole into the preselected area with a tubular drill which axially receives the expandable sleeve and the portion of the earth's structure immediately adjacent thereto, the distortion of the structure forming the wall of the small diameter borehole being reflected by the strain rosettes as the large diameter borehole is drilled.

PATENTED JAN 26 1971 3,557,886

INVENTOR.
JAMES H. COBBS
BY
*Head & Johnson*
ATTORNEYS

INVENTOR.
JAMES H. COBBS
BY
Head & Johnson
ATTORNEYS

METHOD AND APPARATUS FOR MEASURING IN SITU THE EARTH STRESS AT A PRESELECTED SUBTERRANEAN AREA

CROSS-REFERENCE

This disclosure is not related to any pending United States or foreign patent application.

BACKGROUND AND OBJECTS OF THE INVENTION

It is well known that the structure forming the mantle of the earth is under stress. Because of the geometry of the earth's crust and interior forces caused, according to one theory, by the action of convection currents in the earth's molten core, some geographical areas are under a much high stress than others. When stress builds in the earth's crust beyond the point wherein the structure of the crust is able to resist the stress, the stress is relieved by a shifting of the crust. This occurrence is manifested as earthquakes which have throughout recorded history periodically wrought widespread loss of lives and property and due to the increased concentration of population and the erection of a great number of multistory buildings portends possible catastrophic future events.

Geologists have learned that there exists in the earth's crust certain fault lines along which high stresses are most apt to be relieved. It is along these fault lines that earthquakes most frequently occur.

By being able to measure the stress existing in a particular area, and particularly, by being able to chart changes in the stress in the earth's crust at particular areas, it may be possible eventually for scientists to predict with reasonable accuracy both the time and places where earthquakes are likely to occur. It has even been suggested that serious earthquakes may in the future be prevented by the use of underground explosions to relieve built-up stresses in small increments and thereby prevent the stresses in the earth from accumulating to the level wherein their instantaneous relief results in cataclysmic disasters which have occurred in the past.

A great need exists for means of measuring the level of stress in preselected areas of the earth in order to assist in the detection of the possible areas of occurrence of earthquakes. Knowledge of the in situ earth stresses would also be of great value to engineers in the design of tunnels, mines, dams and other structures in the earth. The present techniques of measuring the in situ earth stresses provide mostly indirect measurements. Two general techniques are utilized. The most prominent technique is to measure the change of strain in a rock segment when it is relieved by cutting it free from its surroundings. The second method is to introduce a hydraulic force which causes a fracture failure in a rock with the stress being calculated from the hydraulic force required to cause failure and subsequently confirmation of this measurement by the instantaneous shut in pressure when fracture propogation is halted. The stress relief approach is most beneficial to scientists since it provides not only the quantity of force but the direction of the principle stresses can also be determined. While others have provided means for in situ stress measurements the techniques employed have by and large limited the depth of measurements to approximately 200 feet or less.

This invention provides a new method and apparatus for in situ measurements of earth stress. The invention includes means capable of performing such measurements at greater depths than are now practically possible practicing known methods and using known apparatus.

A more specific object of this invention is to provide a method and apparatus for securing, in a small diameter borehole, strain rosettes cemented to the wall of the borehole and including means of drilling, by means of a tubular drill bit, a hole surrounding the wall of the small diameter borehole to thereby relieve the area surrounding the small diameter borehole of the stresses of the earth and to enable the distortions which occur in the earth structure surrounding the small diameter borehole to be reflected in the strain rosettes, which reflected distortions can be measured and recorded.

These specific objects as well as more general objects of the invention may be understood with reference to the following description and claims taken in conjunction with the drawings.

DESCRIPTIONS OF THE VIEWS

Figure 1:
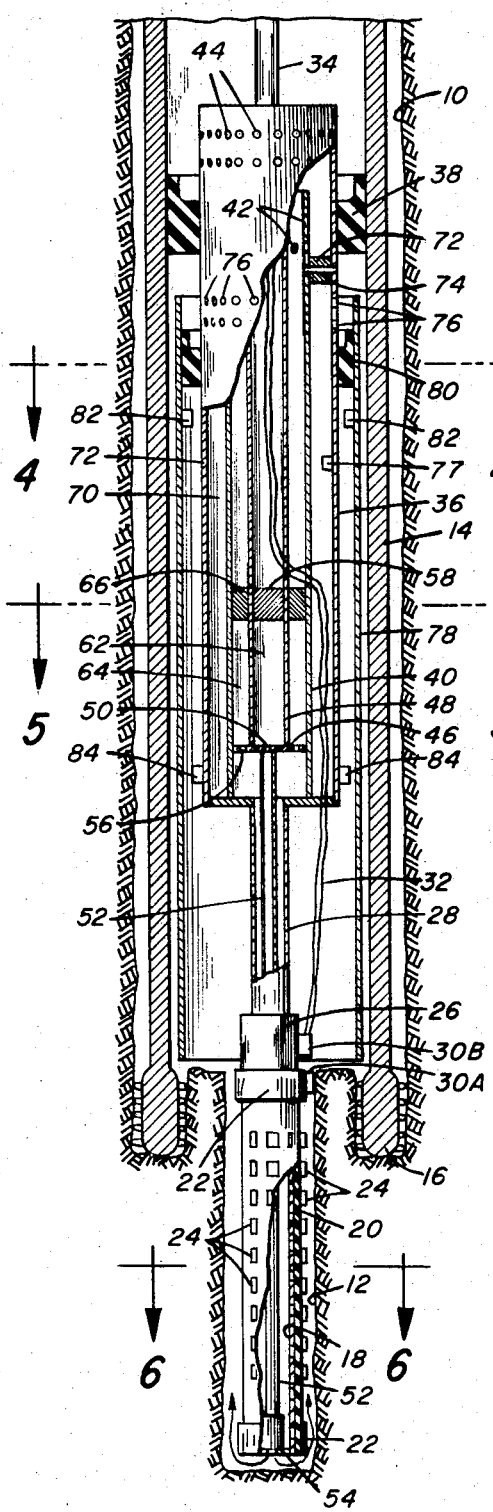
FIG. 1 is an elevational view, shown partly in cross section, of the apparatus of this invention positioned in a borehole in the earth preparatory to practicing the method of measuring the stress in the area of the earth in which the borehole is located.
Figure 4:
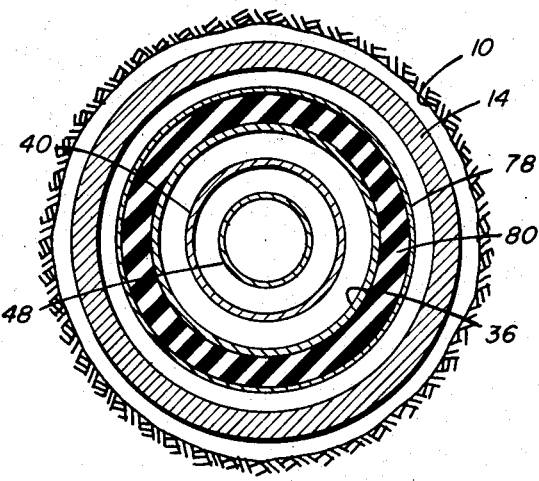
Figure 5:
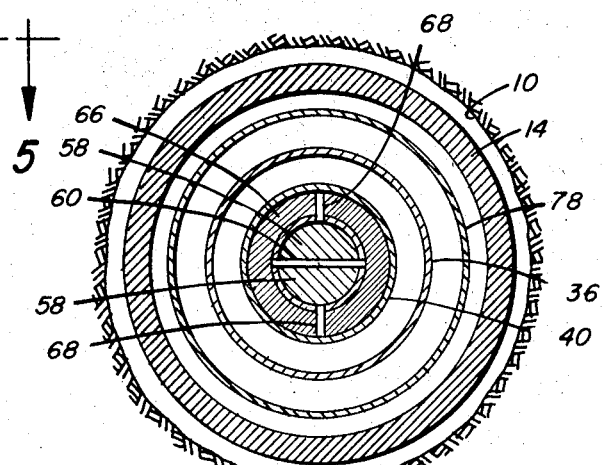
Figure 6:
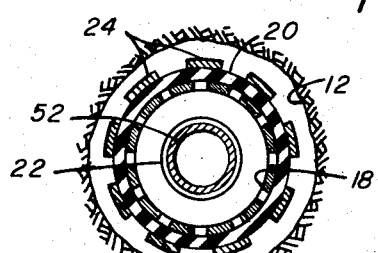

FIGS. 4, 5, and 6 are cross-sectional views of the apparatus of this invention taken along the indicated lines of FIG. 1.

DETAILED DESCRIPTION

Referring to FIG. 1 it is seen that there is provided in the earth a large diameter borehole 10 which extends to the earth's surface. At the bottom of the large borehole 10 is a coaxial small diameter borehole 12. The words "large" and "small" as describing boreholes 10 and 12 are not meant to refer to specific dimensions but to distinguish boreholes 10 and 12 from each other. Typically, borehole 10 will be of a size to accommodate standard drilling tools and equipment such as presently utilized in the oil industry.

The small borehole 12 extends into the area at which it is desired to ascertain the amount and direction of stress in the earth.

Positioned in large borehole 12 is a tubular drilling tool 14 which terminates, on the lower end thereof, with a tubular coring bit 16. The coring bit 16 may typically include the use of diamonds or other abrasive drilling devices. The tubular drill tool 14 may be of the type customarily used in the petroleum industry for taking large diameter cores. Positioned in the small borehole 12 is a perforated support tube 18. Received about the support tube 18 is a flexible expandable sleeve 20. The sleeve 20 may be held in position and sealed at the end such as by means of bands 22.

Secured to the exterior of the flexible sleeve 20 are a plurality of strain rosettes 24 which are devices commonly used for measuring strain on a surface. Such strain rosettes 24 are commercially available and typically of a flat structure on which a wire is bonded, the wire having the characteristic such that its resistance changes as the length changes. After a strain rosette 24 is bonded to a surface, changes in the configuration of the surface produce varying resistance, which resistance may be easily detected, measured and recorded, all utilizing known techniques.

At the upper end of the perforated support tube 18 is a pull out collar 26 and affixed to collar 26 and extending coaxially upwardly is a support tube 28. Each of the rosettes 24 is electrically connected through receptacle 30A and plug 30B and cables 32 and 34 to the earth's surface where the change of resistance of each of the strain rosettes 24 may be indicated and recorded. At the upper end of support tube 28 is a cylindrical support structure 36. The structure 36 is closed at the bottom and secured to cable 34 at the upper end. Surrounding the tubular support structure 36 at the upper end is a packer 38 which prevents the flow of fluid externally of the structure 36.

Coaxially positioned within the tubular support structure 36 is a fluid cylinder 40. The upper end of fluid cylinder 40 is provided with perforations 42 and in like manner the upper end of tubular support structure 36 is provided with perforations 44. Thus fluid pressure within the tubular drill tool 14 and above packer gland 38 can flow through perforations 44 and 42 to the interior of the fluid cylinder 40.

Within fluid cylinder 40 is a bottom plate 46. Supported on bottom plate 46 and extending upwardly therefrom in coaxial relationship is a cement cylinder 48. In the bottom 46 is an opening 50 which communicates with a cement tube 52. The cement tube 52 is received in support tube 28 and terminates at the lower end of perforated support tube 18. A small check valve 54 closes the lower end of tube 52, the check valve 54 functioning to permit flow of fluid downwardly in tube 52 and prohibit reverse flow of fluid. Further, the check valve 54 provides back pressure so that cement contained in the interior of cement cylinder 48 and tube 52 will not flow out until pressure is applied.

Apertures 56 in bottom plate 46 provide communication of the interior of fluid cylinder 40 through support tube 28 with the interior of the perforated support tube 18.

Positioned in the upper end of cement cylinder 48 is a piston 58 which is normally held in position, as shown in FIG. 5, by means of a shear pin 60. Within the cement tube 48 and below piston 58 there is provided a quantity of liquid cement 62.

Surrounding the exterior of cement cylinder 48 is an annular fluid cavity 64 containing a hydraulic fluid. The upper end of the cavity 64 is closed by an annular piston 66 which is normally held in such upward position, as best shown in FIG. 5, by fluid shear pins 68.

In the annular space 70 between the exterior of fluid cylinder 40 and the interior of tubular support structure 36 is an annular piston 72 held in its normal position as illustrated by shear pin 74. The annular piston 72 is below perforations 42 in the fluid cylinder 40 and is above perforations 76 in the wall of the support structure 36. Affixed to the interior surface at about half way the length of the support structure 36 is a stop element 77 which serves to limit the downward travel of annular piston 72. Slidably and coaxially positioned exteriorly of the support structure 36 is a core barrel 78. Secured to the inner surface of the upper end of the core barrel 78 is an annular seal 80 which slidably and sealably engages the external surface of support structure 36. Affixed to the interior surface of the core barrel 78 below the annular seal 80 are core barrel stops 82 and correspondingly, affixed to the exterior surface of support structure 36 at the lower end thereof are core barrel stops 84, stops 82 and 84 serving to limit the travel of the core barrel relative to the support structure.

METHOD OF PRACTICING THE INVENTION AND OPERATION OF THE APPARATUS

With the large diameter borehole 10 drilled in the earth and terminating immediately above the area wherein the stress measurement is to be made, the next step in practicing the invention is drilling a small diameter borehole coaxially in the bottom of the large diameter drill borehole, the small diameter borehole extending into or through the area wherein the earth stress is to be measured. Boreholes 10 and 12 may be drilled by utilizing apparatus and practicing customary and known methods of drilling and coring of the oil industry.

Tubular drilling tool 14 is then positioned in the large borehole 10. The drilling tool 14 is connected by means extending to the earth's surface for the rotation and withdrawal thereof when necessary, customary means including a length of drill pipe. Next, there is positioned in the interior of the tubular drilling tool 14, such as by means of lowering the apparatus on cable 34, the structure illustrated in FIGS. 1, 2 and 3 of the drawings. The packing gland 38 secured to the exterior cylindrical surface of the support structure 36 prevents fluid above the gland from flowing within apparatus except through openings provided. With the apparatus in place, as shown in FIG. 1, the further steps of practicing the invention may be commenced.

The first step is the application of hydraulic fluid pressure to the interior of the drill tube 14. Such hydraulic pressure flows through apertures 44 to the interior of the support structure 36 and through apertures 42 into the interior of fluid cylinder 40. Such hydraulic pressure is applied to pistons 66, 58 and 72. The shear pins holding each of these pistons is arranged such that the shear pin 60 holding piston 58 shears at the lowest pressure. Thus, when the pressure interior of the drill tube 14 reaches this preselected pressure, piston 58 moves downwardly within the cement cavity 62 causing cement therein to flow through aperture 50, tube 52, and out the check valve 54. The cement flows up the annular area externally of the flexible sleeve 22 and within the small borehole 12 as indicated by the arrows.

Next, additional hydraulic pressure is applied at the earth's surface which shears pins 68 permitting annular piston 66 to move downwardly. This forces fluid in cavity 64 to flow outwardly through apertures 56 and through the interior of support tube 28 to the interior of perforated support tube 18. This fluid pressure flows through the perforations of the perforated tube 18 and expands the flexible sleeve 22 outwardly so that the strain rosettes 24 thereon are forced in engagement with the wall of small borehole 12. This pressure is maintained for sufficient duration such that the strain rosettes, by the effect of the cement having previously been forced in the annular area within the borehole 12, to bond to the interior of the borehole 12.

With the strain rosettes 24 bonded to the wall of the small borehole 12, any change in the configuration of the borehole will be reflected by the strain rosettes and such communicated by way of conductors 32 and cable 34 to the earth's surface.

Additional fluid pressure applied by means at the earth's surface and communicated to the interior of drill tool 14 results in the shearing of pins 74 restraining piston 72, causing piston 72 to move downwardly until it engages stop 77. This downward movement of annular piston 72 exposes aperture 76. Fluid communication is then provided from the interior of support structure 36 through aperture 76 and thereby to the exterior of the support structure below the packer gland 38 and so fluid pressure is thus applied to gland 80 causing core barrel 78 to move downwardly.

Figure 2:
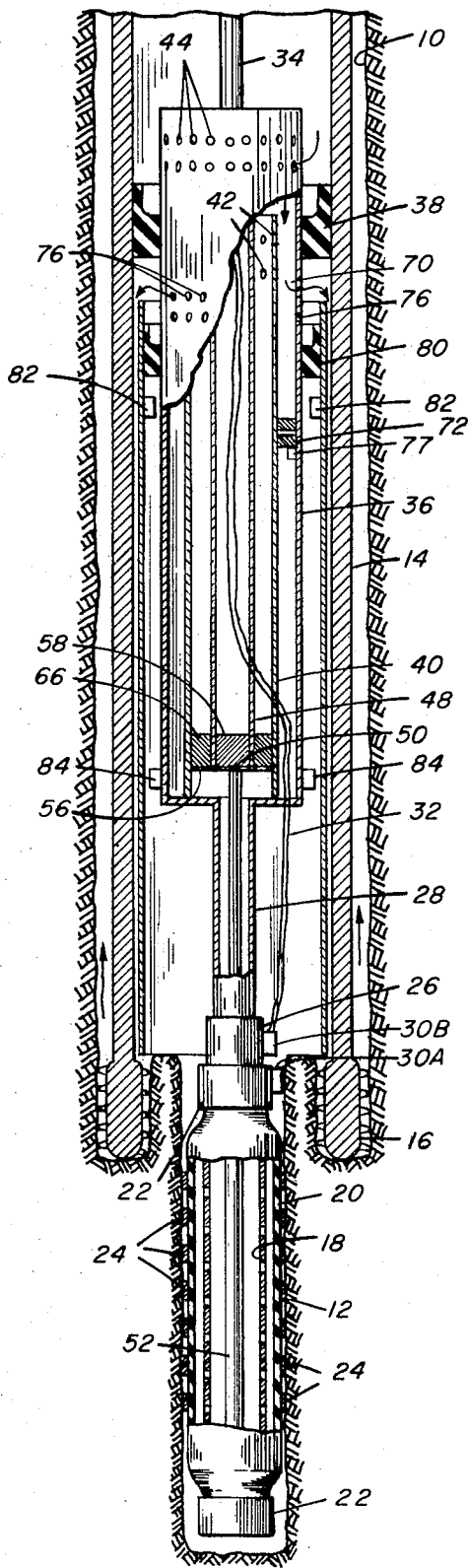
FIG. 2 is a cross-sectional view shown in FIG. 1 and showing the relationship of the elements of the apparatus of the invention during the practicing of the steps of measuring the stress in the earth according to this invention.

The termination of these three steps wherein the hydraulic pressure has been successively increased results in the relationship of the components being such as shown in FIG. 2.

Next, the tubular drill tool 14 is rotated by means at the earth's surface, such as by standard rotary drilling apparatus, to extend the large borehole 10 to encompass the area penetrated by a small borehole 12. As the large diameter borehole is extended the area surrounding small diameter borehole 12 is relieved from the strain applied by the earth's structure. As this strain is relieved the structure surrounding the borehole 12 is distorted, which distortion is reflected by the strain rosettes 24 bonded thereto and conveyed by means of electrical signals through cable 34 to the earth's surface. Thus, the strain to which the earth structure making up the area surrounding small borehole 12 is subjected is detected and can be measured; such measurements can be recorded utilizing known techniques. With the strain rosettes 24 oriented in preselected directions, which may be achieved by orientation means well known in the petroleum industry the direction of the stress forces may also be determined.

It can be seen, by the arrows in FIG. 2, that continued fluid pressure as the deepening of the large borehole 10 is undertaken results in fluid flow down the annular area externally of core barrel 78 and internally of the drill tool 14, past the coring bit 16 wherein cuttings are picked up and up the annular area within large drill hole 10 and externally of the drill tool 14.

Figure 3:
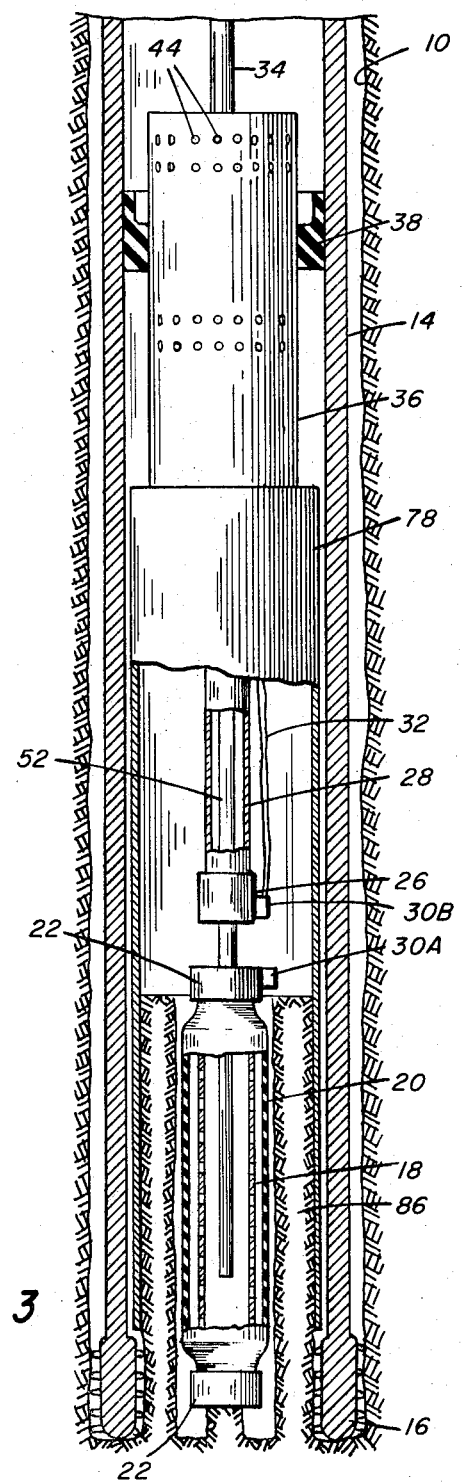
FIG. 3 is a cross-sectional view as shown in FIGS. 2 and 3 and showing the initial stages of removing the apparatus of the invention following the completion of a measurement procedure.

FIG. 3 shows the completion of a strain measurement in a preselected area. As upward force is applied to cable 34 the apparatus is moved upwardly and pull out collar 26 separates from the perforated support tube 18 and the upper half 30B of the connector separates from the lower half 30A so that all that remains in the hole is the perforated support tube 18 and flexible sleeve 20 with the strain rosettes thereon.

Depending upon the hole size combinations, in some instances it may be possible to recover the annular ring of rock 86 inside the tubular core barrel 78. If this is not the case and if it is desired to proceed to a lower depth to make a subsequent strain measurement, the perforated support tube and flexible sleeve thereon may be reamed out as the large diameter borehole is advanced. When the large diameter borehole reaches the area immediately above the next preselected area within the earth's crust wherein a second strain measurement is to be made, a small borehole is provided and the tools illustrated in FIGS. 1 through 3 are lowered into the hole and the operation repeated.

While the invention has been described with a certain degree of particularity, it is manifest that many changes may be made in the details of construction and the arrangement of components without departing from the spirit and scope of this disclosure.

I claim:

1. A method of measuring in situ the earth stress at a preselected subterranean area comprising:

drilling a larger diameter borehole from the earth's surface to a point immediately above the preselected area;

drilling a smaller diameter borehole from the bottom of the borehole into the preselected area;

positioning into the smaller diameter borehole an expandable sleeve having a plurality of strain rosettes, each of the strain rosettes being connected electrically to a recording means;

injecting glue externally of said expandable sleeve into the smaller diameter borehole;

applying hydraulic pressure to the interior of the expandable sleeve to expand the same against the walls of the smaller diameter hole;

maintaining the pressure on the interior of the expandable sleeve for a duration sufficient for the glue in the smaller diameter borehole to bond the strain rosettes to the wall of the smaller diameter borehole; and drilling the larger diameter borehole into the preselected area with a tubular drill which axially receives the expandable sleeve, the distortion of the structure forming the wall of the smaller diameter borehole as the larger diameter borehole is deepened therearound being detected by the strain rosettes bonded thereto.

2. Apparatus for measuring in situ the earth stress at a preselected subterranean area traversed by a small diameter borehole extending coaxially downwardly from a large diameter borehole comprising:

a tubular drill bit positioned in the large diameter borehole;

a perforated support tube of diameter less than the small borehole and positioned axially therein;

a flexible, expandable sleeve positioned over the exterior surface of said perforated tube;

a glue reservoir supported to and above said perforated support tube;

a cement tube within said support tube and connected at the upper end thereof to said glue reservoir, the lower end of said glue tube communicating with the exterior of said perforated support tube at the lower end thereof;

at least one strain rosette supported to the exterior of said expandable sleeve;

means electrically communicating said strain rosette to a recording device;

means of discharging flue contained in said glue reservoir through said glue tube to flow said glue into the annulus between said expandable sleeve and the small diameter borehole;

means of expanding said expandable sleeve to force said strain rosette into contact with the wall of the small diameter borehole; and means extending to the earth's surface for the rotation of said tubular bit.

3. Apparatus for measuring in situ the earth stress of a preselected subterranean area according to claim 2 wherein said glue reservoir is a cylinder, said cement tube communicating with said cylinder at the lower end thereof, and wherein said means of discharging glue contained in said reservoir includes a piston positioned in the upper end of said cylinder, said piston being forced downward by fluid pressure within said tubular drill bit.

4. Apparatus according to claim 3 including a shear pin normally retaining said piston in the upper end of said cylinder whereby preselected fluid pressure within said tubular drill is required to force said piston downwardly to discharge said glue.

5. Apparatus for measuring in situ the earth stress at a preselected subterranean area according to claim 2 including:

a cement cylinder forming said glue reservoir, said cement cylinder tube communicating with said cement cylinder at the lower end thereof;

a piston positioned in said cement cylinder;

a shear pin normally retaining said piston in the upper end of said cement cylinder;

a fluid cylinder positioned above said perforated support tube;

means communicating the lower end of said fluid cylinder with the interior of said perforated support tube;

a piston positioned in said fluid cylinder;

a shear pin normally retaining said piston in the upper end of said fluid cylinder, both said cement cylinder and said fluid cylinder having communication at the upper ends thereof with the interior of said tubular drill bit whereby a first preselected fluid pressure causes said shear pin restraining said piston in said cement cylinder to shear and thereby force cement out of said cement cylinder, and a second, higher pressure causes said shear pin restraining said piston in said fluid cylinder to shear and thereby force fluid out of said fluid cylinder.

6. Apparatus for measuring in situ the earth stress at a preselected subterranean area according to claim 5 wherein said fluid cylinder and said cement cylinder are coaxial, one of the cylinders being annular about the other, the piston in said annular cylinder being ring shaped.